United States Patent
Jouard et al.

(10) Patent No.: US 11,668,954 B2
(45) Date of Patent: Jun. 6, 2023

(54) SPECTACLE FRAME COMPRISING ELECTRICAL CONDUCTORS AND HAVING A CONTROLLED FOLDABILITY, METHOD OF MANUFACTURING

(71) Applicant: Essilor International, Charenton-le-Pont (FR)

(72) Inventors: Ludovic Jouard, Charenton-le-Pont (FR); Marc Reignault, Charenton-le-Pont (FR); Loic Baillon, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 315 days.

(21) Appl. No.: 16/762,020

(22) PCT Filed: Nov. 8, 2018

(86) PCT No.: PCT/EP2018/080646
§ 371 (c)(1),
(2) Date: May 6, 2020

(87) PCT Pub. No.: WO2019/092121
PCT Pub. Date: May 16, 2019

(65) Prior Publication Data
US 2020/0355944 A1  Nov. 12, 2020

(30) Foreign Application Priority Data

Nov. 8, 2017 (EP) .................................. 17306546

(51) Int. Cl.
*G02C 5/22* (2006.01)
*G02C 13/00* (2006.01)
*G02C 11/00* (2006.01)

(52) U.S. Cl.
CPC ......... *G02C 5/2272* (2013.01); *G02C 13/003* (2013.01); *G02C 11/10* (2013.01)

(58) Field of Classification Search
CPC .... G02C 11/10; G02C 13/003; G02C 5/2272; G02C 11/00
(Continued)

(56) References Cited

U.S. PATENT DOCUMENTS 3,052,160 A * 9/1962 Ratti ........................ G02C 5/10
351/83
4,904,075 A * 2/1990 Blumenthal ............. G02C 5/16
351/114
(Continued)

FOREIGN PATENT DOCUMENTS

AT      308 423        5/1973
CN     205581433 U    9/2016
(Continued)

OTHER PUBLICATIONS

Machine Translation of WO2011/117909 (Year: 2011).*
(Continued)

*Primary Examiner* — Darryl J Collins
*Assistant Examiner* — Matthew Y Lee
(74) *Attorney, Agent, or Firm* — Oblon, McClelland, Maier & Neustadt, L.L.P.

(57) ABSTRACT

A spectacle frame including a first part, at least a second part, a joining part joining the second part to the first part allowing to fold and unfold the second part relative to the first part so that the second part be movable between respective closed position and open position, at least an electrical wiring arranged through the joining part to allow an electrical connectivity between the first part and the second part, wherein the joining part is elastically deform- (Continued)

able with curvature radius values higher than a predefined minimum curvature radius value.

16 Claims, 6 Drawing Sheets

(58) Field of Classification Search
USPC .......................... 351/111–119, 41, 120–129
See application file for complete search history.

(56) References Cited

U.S. PATENT DOCUMENTS

| | | |
|---|---|---|
| 2004/0032564 A1 | 2/2004 | Meiler |
| 2012/0002159 A1 | 1/2012 | Blum et al. |
| 2012/0002160 A1 | 1/2012 | Blum et al. |
| 2014/0028966 A1 | 1/2014 | Blum et al. |
| 2014/0293215 A1 | 10/2014 | Blum et al. |
| 2015/0061166 A1 | 3/2015 | Van De Vrie et al. |
| 2015/0127132 A1 | 5/2015 | Nyong'o et al. |
| 2017/0017094 A1* | 1/2017 | James ................ G05B 19/4099 |
| 2017/0031181 A1 | 2/2017 | Blum et al. |
| 2017/0075141 A1 | 3/2017 | Blum et al. |
| 2017/0160563 A1* | 6/2017 | Calilung ................ G02C 11/00 |
| 2018/0373057 A1* | 12/2018 | Hino ...................... G02C 11/10 |

FOREIGN PATENT DOCUMENTS

| | | | |
|---|---|---|---|
| DE | 102 26 103 C1 | 10/2003 | |
| DE | 20 2016 002 203 U1 | 8/2016 | |
| GB | 542876 | 1/1942 | |
| JP | 49-22468 B1 | 6/1974 | |
| JP | 1-99020 A | 4/1989 | |
| JP | 2015-522842 A | 8/2015 | |
| WO | WO2011/117909 * | 9/2011 | ........... G02C 5/2209 |
| WO | WO 2012/003499 A2 | 1/2012 | |
| WO | WO 2013/149891 A1 | 10/2013 | |
| WO | WO 2013/188805 A2 | 12/2013 | |
| WO | WO 2017/004600 A1 | 1/2017 | |
| WO | 2017/110908 A1 | 6/2017 | |

OTHER PUBLICATIONS

International Search Report dated Jan. 8, 2019 in PCT/EP2018/080646 filed Nov. 8, 2018.

Notice of Reasons for Refusal dated Dec. 5, 2022, issued in corresponding Japanese patent application No. 2020-524859 (with English translation).

* cited by examiner

SPECTACLE FRAME COMPRISING ELECTRICAL CONDUCTORS AND HAVING A CONTROLLED FOLDABILITY, METHOD OF MANUFACTURING

TECHNICAL FIELD OF THE INVENTION

The invention relates generally to the field of optics. More precisely, the invention relates to mechanical optics with a spectacle frame comprising an electrical wiring, notably electrical wires, and having a controlled foldability. The invention is also related to a method of manufacturing of the spectacle frame and more particularly considering a three-dimensional printing process.

BACKGROUND INFORMATION AND PRIOR ART

Due to the reduction in size and consumption of modern electronics, more and more electronic devices are incorporated in spectacle frames. The wording electronics is taken here in its wide meaning, covering electronic parts, processors, power supply such as batteries, wiring, transducers, antennas and whatever in relation to it and necessary for the expected operation of it.

Documents US20140293215, US20140028966, U.S. Pat. Nos. 6,099,117 and 6,163,926 describe spectacles including electronic devices or hinge means for spectacles.

In general, the electronic is distributed in different parts of the spectacles and electrical wirings are arranged between those parts in the form of wires, cables or flexible printed circuit boards. In particular, electronics can be distributed between the front part of the frame and one of or the two temples. However, the link between the front part of the frame and the two temples is hinged to be able to fold and unfold the spectacle frame. The related hinge is a stress point for the electrical wiring and repeated folding and unfolding or excessive folding or unfolding may lead to breakage in the electrical wiring.

The main objective of the invention is to optimize the integration of electronics in a spectacle frame and reduce the risk of breakage and notably with the help of additive manufacturing technology or, event subtractive technology (e.g. milling). In particular, three-dimensional printing technology may be used for the manufacture of the spectacle frames of the invention.

SUMMARY OF THE INVENTION

Therefore, one object of the invention is to provide a spectacle frame comprising:
  a first part,
  a second part,
  a joining part joining the second part to the first part allowing to fold and unfold the second part relative to the first part so that the second part be movable between respective closed position and open position,
  at least an electrical wiring arranged through the joining part to allow an electrical connectivity between the first part and the second part.

According to the invention, the joining part is elastically deformable with curvature radius values higher than a predefined minimum curvature radius value.

In other words, thanks to the elastically deformation, in the fold/closed state/position of the second part relative to the first part of the joining part that is flexible, the joining part being thus curved, a wiring that is in the joining part is not overstressed. This also means that the smallest curvature radius value that is obtainable when the second part is folded/closed with a bending that curves it, is higher than a predefined minimum curvature radius value. Under this smallest obtainable curvature radius, the integrity of the frame and/or of the wiring would likely be destroyed.

In various embodiments of the spectacle frame according to the invention, the following means, which can be used alone or in any technically possible combination, are also used:
  the joining part is only deformable when an external force is applied to it,
  the joining part has elastic properties allowing it to regain a determined position or shape when an external force is suppressed,
  the first part is a first part of the frame and the second part is a second part of the frame,
  the first part is a front part and the second part is a temple,
  the first part and the second part are located in the same temple,
  the first part is an anterior part of a temple and the second part is a posterior part of the same temple,
  the first part and the second part are located in the same front part,
  the first part is a left part of a front part and the second part is a right part of the same front part,
  the first part is a nose pad and the second part a front part,
  the first part and the second part are located in the same nose pad,
  the elastically deformation with a curvature radius forms a rounding and not an angle,
  the spectacle frame comprises two temples,
  the joining part is not extensible,
  the joining part is flexible,
  the joining part by itself is integral or not,
  in the joining part that is by itself not integral, the joining part is made of elements that are united together,
  the joining part is integral fully or in part with the temple,
  the joining part is integral fully or in part with the front part,
  the joining part is integral fully or in part with the temple and with the front part,
  the joining part is a separated element that is united to the temple and to the front part, located between them,
  in the joining part that is integral in part only, the non-integral part of the joining part is a part that is integral to the front part,
  in the joining part that is integral in part only, the non-integral part of the joining part is a part that is integral to the temple,
  the temple and the front part are separated elements that are united together,
  the electrical wiring arranged through the joining part electrically connects at least a device of the temple to another device of the front part and/or to another device of another temple,
  the front part of the spectacle frame defines a vertical front plane in front of the face and the eyes of the wearer of the spectacle frame, the temple defines an axis that is approximately horizontal and, in the unfolded/open state/position, an axis that is also approximately perpendicular to the front plane and toward the rear thereof, said axis being then lateral to the temple of the wearer, and, in the folded/closed state/position, an axis that is also approximately parallel to the front plane, in addition, the temple is bendable horizontally, said horizontal bending being not elastic causing a permanent deformation, in addition, the temple is bendable vertically, said vertical bending being not elastic causing a permanent deformation, the joining part has an internal face on the side of the joining part facing the center of curvature of the folding and an external face opposite to the internal face and vertical slots are arranged in the external face of the joining part, said slots being sensibly closed in the unfold/open state, the internal face of the joining part is facing the lateral part of the head of the wearer of the spectacle frame, the joining part has an internal face on the side of the joining part facing the center of curvature of the folding and an external face opposite to the internal face and vertical slots are arranged in the internal face of the joining part, said slots being wide in the unfold/open state, the joining part has an internal face on the side of the joining part facing the center of curvature of the folding and protruding elements are arranged on said internal face, the joining part has an internal face on the side of the joining part facing the center of curvature of the folding and an external face opposite to the internal face and protruding elements are arranged on said external face, the joining part has an upper face and a lower face, the temple has four faces with an internal face facing the lateral part of the head of the wearer of the spectacle frame, and an external face opposite to the internal face, and an upper face and a lower face, in the spectacle frame, at least the joining part is made of plastics, the joining part is made of at least two materials, one of the materials being harder than the other, the hard material is not flexible, the flexible material is integral to the electrical wiring, the flexible material and the hard material is integral to the electrical wiring, the electrical wiring is a printed circuit board and the spectacle frame is made of the printed circuit board, the flexible material has augmented flexibility when heated, the flexible material has augmented flexibility when heated, the flexible material has augmented flexibility when heated at a temperature above 60° C., the flexible material has less flexibility when at a temperature under 60° C., the flexible material is almost not flexible when at a temperature under 60° C., the flexible material is almost not flexible when at room temperature, the hard material is still not flexible when heated at a temperature above 60° C. and under 150° C., the joining part is made of at least two materials, one of the materials being less flexible than the other, the joining part is made of a unique material, the joining part comprising multiple elements having different flexibility levels due to their different shapes, the joining part is made of a unique material, the joining part comprising multiple parts having different hardness levels due to their different shapes, the joining part is made of a hard material and of a flexible material, in the joining part made of a hard material and of a flexible material, the hard material has a hardness strictly superior to the hardness of the flexible material, in the joining part made of a hard material and of a flexible material, the flexible material is continuous from one end to the other end of the joining part and the hard material is separated in the form of at least two segments, one integral to one end (for example on the temple side) and the other integral to the other end (for example on the front part side) and that can angulate, and possibly slide, between them, in the joining part made of a hard material and of a flexible material, the flexible material is continuous from one end to the other end of the joining part and the hard material is separated by a hinge between two segments, one integral to one end (for example on the temple side) and the other integral to the other end (for example on the front part side) and that are able to angulate between them, preferably the flexible material that is continuous from one end to the other end of the joining part is a tube containing the wiring, the hard material is inserted in a matrix of the flexible material or the flexible material is inserted in a matrix of the hard material so that the flexible material ensures the flexibility of the joining part while the hard material ensures the curvature radius value of the joining part to be higher than the predefined minimum curvature value, the use of a flexible material and a hard material is equivalent to the use of a unique material with different shapes giving different deformabilities or stiffnesses or flexibilities as a function of the shape, this is also equivalent to the use of multiple elements having different shapes, the joining part is made of a unique material, the joining part comprises multiple elements having different flexibility levels due to their different shapes, the multiple elements comprise a plurality of protruding elements, the multiple elements comprise a plurality of voids intended to reduce the section of the joining part, the joining part comprises a plurality of protruding elements between the front part and the temple, the protruding elements are arranged at regular intervals from one another between the front part and the temple in the joining part, the joining part has an internal face on the side of the joining part facing the center of curvature of the folding and the protruding elements is arranged on said internal face, conversely, the protruding elements are arranged on the external face of the joining part, the joining part comprises a plurality of voids intended to reduce the section of the joining part between the front part and the temple, the voids are arranged at regular intervals from one another between the front part and the temple in the joining part, the joining part has an internal face on the side of the joining part facing the center of curvature of the folding and the voids being arranged on said internal face, conversely, the voids are arranged on the external face of the joining part, the joining part has an internal face on the side of the joining part facing the center of curvature of the folding and an external face opposite to the internal face, the protruding elements and/or the voids being arranged on the internal face and/or on the external face of the joining part, the joining part comprises at least one stop device intended to prevent the temple from going beyond a defined fold/closed state/position, the joining part comprises at least one stop device intended to prevent overpass of the limited curvature radius of the folding, the joining part comprises a first stop device intended to prevent the curvature radius values of the joining part to be greater than a predefined maximum curvature radius value when unfolding the second part relative to the first part, the joining part comprises a first stop device intended to prevent the curvature radius values of the joining part being greater than a predefined maximum curvature radius value when unfolding the temple relative to the front part, the predefined minimum curvature radius value is lower than the predefined maximum curvature radius value, the protruding elements form the first stop device, the protruding elements being arranged on the external face of the joining part, each protruding element having a stem and an enlarged head forming the end of the stem, the heads being separated by gaps when the second part is folded, said gaps reducing when the second part is unfolded till the heads abut together thus creating a stop to the unfolding and preventing overpass of the predefined maximum curvature radius value, the protruding elements form the first stop device, the protruding elements being arranged on the external face of the joining part, each protruding element having a stem and an enlarged head forming the end of the stem, the heads being separated by gaps when the temple is folded, said gaps reducing when the temple is unfolded till the heads abut together thus creating a stop to the unfolding and preventing overpass of the predefined maximum curvature radius value, the joining part comprises a second stop device intended to prevent the second part from going beyond a defined closed position in which the curvature radius value of the joining part is higher than the predefined minimum curvature radius value, the joining part comprises a second stop device intended to prevent the temple from going beyond a defined closed position in which the curvature radius value of the joining part is higher than the predefined minimum curvature radius value, the protruding elements form the second stop device, the protruding elements being arranged on the internal face of the joining part, each protruding element having a stem and an enlarged head forming the end of the stem, the heads being separated by gaps when the second part is unfolded, said gaps reducing when the second part is folded till the heads abut together thus creating a stop to the folding and preventing the second part from going beyond the defined closed position, the protruding elements form the second stop device, the protruding elements being arranged on the internal face of the joining part, each protruding element having a stem and an enlarged head forming the end of the stem, the heads being separated by gaps when the temple is unfolded, said gaps reducing when the second part is folded till the heads abut together thus creating a stop to the folding and preventing the temple from going beyond the defined closed position, the joining part comprises a bridge part, an abutment part and a sliding part, forming the first and the second stop devices the bridge part being integral to the first part and to the second part so as to create a bridge between the first part and the second part, said bridge part being flexible, the abutment part being integral to the first part and being less flexible than the bridge part, the sliding part being integral to the second part and being less flexible than the bridge part, the sliding part being located between the bridge part and the abutment part, the bridge part being located facing the center of curvature of the folding, in order that when the second part is folded, the sliding part bears and slides on the abutment part and creates a strength opposed to the folding, the joining part comprises a bridge part, an abutment part and a sliding part, forming the first and the second stop devices the bridge part being integral to the front part and to the temple so as to create a bridge between the front part and the temple, said bridge part being flexible, the abutment part being integral to the front part and being less flexible than the bridge part, the sliding part being integral to the temple and being less flexible than the bridge part, the sliding part being located between the bridge part and the abutment part, the bridge part being located facing the center of curvature of the folding, in order that when the temple is folded, the sliding part bears and slides on the abutment part and creates a strength opposed to the folding, in the case of the joining part comprising the first and the second stop devices with a bridge part, an abutment part and a sliding part, the joining part further comprises a locking part integral to the first part of the spectacle frame, the sliding part being located between the abutment part and the locking part, the end of the sliding part comprising an enlarged head that can be locked into a recess of the base of the locking part in the unfolded state, in the case of the joining part comprising the first and the second stop devices with a bridge part, an abutment part and a sliding part, the joining part further comprises a locking part integral to the front part of the spectacle frame, the sliding part being located between the abutment part and the locking part, the end of the sliding part comprising an enlarged head that can be locked into a recess of the base of the locking part in the unfolded state, in the case of the joining part comprising the first and the second stop devices with a bridge part, an abutment part, a sliding part and a locking part, the end of the sliding part comprising an enlarged head, the abutment part comprises a set of notches in which the enlarged head can stop and creating an indexing of intermediate position of the folding and the unfolding, in the case of the joining part comprising the first and the second stop devices with a bridge part, an abutment part, a sliding part and possibly a locking part, the end of the sliding part possibly comprising an enlarged head, the abutment part comprises at its end a shoulder directed toward the interior of the joining part and on which the enlarged head or the end of the sliding part in case the enlarged head is omitted, abuts when the second part, for example the temple, is in the closed/fold position/state, in the case of the joining part comprising the first and the second stop devices with a bridge part, an abutment part, a sliding part and a locking part, the end of the sliding part comprising an enlarged head, the abutment part comprises at its end a notch and a shoulder directed toward the interior of the joining part and on which the enlarged head abuts when the second part, for example the temple, is in the closed/fold position/state, the enlarged head locking into the notch when the second part, for example the temple, is in the closed/fold position/state, the joining part comprises a set of stop devices, the joining part having an internal face on the side of the joining part facing the center of curvature of the folding and protruding elements being arranged on said internal face, said protruding elements having enlarged end heads toward the center of curvature, the heads being separated by gaps (equivalent to slots) when the second part, for example the temple, is unfold/open, said gaps (equivalent to slots) reducing when the second part, for example the temple, is folded/closed till the heads abut together thus creating a stop to the folding/closing and limiting the curvature radius of the folding, the joining part comprises a set of stop devices, the joining part having an internal face on the side of the joining part facing the center of curvature of the folding and an external face opposite to the internal face and the protruding elements are arranged on said external face, said protruding elements having enlarged end heads towards the exterior, the heads being separated by gaps (equivalent to slots) when the second part, for example the temple, is fold/closed, said gaps (equivalent to slots) reducing when the second part, for example the temple, is unfolded/opened till the heads abut together thus creating a stop to the unfolding/opening, the joining part has slots and/or protruding elements and/or gaps on both its internal and external faces, the minimum curvature radius of the joining part is strictly superior to the minimum allowed radius of curvature of the electrical wiring, the minimum allowed radius of curvature of the electrical wiring corresponds to a bending of the wiring causing degradation of the wiring on the spot or when repeated over time, the spectacle frame comprises at least one housing or cavity intended to receive electronic devices and notably sensors and/or power supply.

A further object of the invention is to provide a method for manufacturing a spectacle frame, the spectacle frame being according to the invention related to the spectacle frame and in that a three-dimensional printing process is used for at least one part of the spectacle frame.

In various embodiments of the method according to the invention, the following means, which can be used alone or in any technically possible combination, are also used:

the part of the spectacle frame that is manufactured with a three-dimensional printing process is selected from one or more of the first part, the second part, the joining part and/or one sub-part of the previous parts, the method comprises the assembling of the front part with the temple according to wearer's needs, the method comprises the creation of a housing in the joining part based on data of a given wearer, the housing being intended to receive a wiring and eventually at least one sensor, the data of a given wearer is related to at least the morphological characteristics of the wearer such as for example the angles at the level of the nose, the length of the temple, the position of the eyes, curving contour of the face . . .

the data of a given wearer is also related to aesthetical wishes of the wearer.

The invention is particularly interesting in relation to three-dimensional printing of the spectacle frames and having additional functions given by electronics that can be embedded within the spectacle frames. Thanks to the invention, it is possible to create hinges that will increase the lifetime of the embedded components, notably the wiring, or/and simplify the assembly process of the spectacle frame. In addition, the three-dimensional printing would help to simplify the customization of the integration of electronics for each wearer. For example, the specific location of a sensor in the spectacle frame can be critical for the accuracy of the data that is collected by the sensor and the three-dimensional printing would help to simplify the customization of the sensor integration for each wearer. Possible other advantages are better aesthetics of the spectacle frame and of the wiring, increased reliability (Minimum curvature radius of the flex/cable/wire, low tensile stress), simplification of the manufacturing (reduced quantity of parts, reduced volume, simplification of assembly process . . . ), no tooling cost thanks to three-dimensional printing and, more generally, the ease of customization of the manufacturing.

SHORT DESCRIPTION OF THE FIGURES

The appended figures will allow a good understanding of how the invention may be implemented. In these figures, same references designate similar elements. In addition, further advantages of the invention will become apparent in relation to the figures, in which.

DETAILED DESCRIPTION OF EXAMPLE(S)

The invention is dealing with electronics frames specifically designed considering three-dimensional printing process possibilities. The main objective is to optimize the integration of electronics in a frame with the help of additive manufacturing technology. However, it is also possible to use subtractive manufacturing technology in combination to additive or on its own but this adds some complexity to the manufacturing process.

In the following examples, the whole spectacle frame is printed with a three-dimensional process. It has been designed to received electronic parts and simplify the spread of connection through its structure. However, the invention is more specifically interesting for the design of the hinge part of the spectacle frame. Preferably, the hinge is manufactured by additive manufacturing technology, i.e. three-dimensional printing. With further details, the frame includes a specific shape designed to cover the standard particularity of hinges and it allows to reduce the volume of the frame when not used thus easing the storage and also provides ergonomic of the frame on the head of the wearer to ensure a comfortable level of tightening on the head: keep in place vs painful strength.

The specific shape is designed considering the possibilities brought by three-dimensional printing technologies. It is also optimized to ensure that the level of deformation and strain stay in the elastic domain of the materials used in the spectacle frame. This specific shape is also designed to embed one or several electrical conductive elements (cable, wire, flexible printed circuit, . . . ). Its design will ensure one or several of the following statement: a bend radius strictly superior to a predefined minimum curvature radius, protection of the electrical conductor toward environment (protection against dust, water, heat, UV . . . ), aesthetical design, protection of the wearer (minimum contact of the spectacle frame on the wearer, less heat), reduction of constraints on the conductor (low to no tensile stress, optimized friction coefficient . . . ). The electronic frame may include but is not limited to: active lenses (electrochromic lenses . . . ), sensors (Light, UV, accelerometer, IMU, Camera, proximity, blink, eye tracker . . . ), active components (LED, Bluetooth, phone, Haptic device, Micro-processor, micro controller . . . ), power supplies (batteries, cells . . . ). Thanks to the invention, the electronic functions and components may be installed at any location in the spectacle frame: front part, glasses, temple, nose . . . .

Over the realization of the specific shape, the three-dimensional printing process brings also several advantages which include but are not limited to: the personalization of the product on aesthetical design (color, extra decoration, global shape . . . ), the personalization ergonomic (overall size, nose pad orientation, temple length . . . ), the personalization of the sensor implantation (sensor orientation, sensor location to the body or the skin . . . ), to facilitate the integration of electronic, to facilitate the assembly process in case of multiple parts, to reduce the design constraint.

To manufacture the spectacle frame and notably the joining part that allows folding and unfolding, any kind of three-dimensional printing technology or derivative (4D, 5D . . . printing) with one or two or three or more materials can be used including but not limited to: Fused Deposition Modelling (FDM), stereolithography (SLA), stereo-jet printing, Digital Light Processing (DLP), Selective Laser Melting (SLM), Selective Laser Sintering (SLS), Direct Metal Laser Sintering (DMLS), Laminated Object Manufacturing (LOM).

Device

Figure 1:
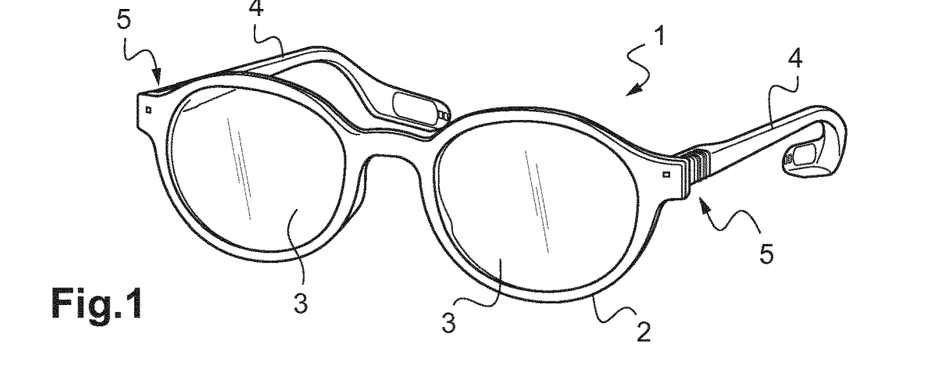
FIG. 1 is a perspective view of a spectacle frame according to the invention and comprising a front part and two temples interconnected with two joining parts, in the unfolded/open state.

In the example of FIG. 1, the spectacle frame 1 is in an unfolded state or open state in which the temples 4, that corresponds to the second part, are approximately perpendicular to the front part 2, that corresponds to the first part, of the spectacle frame 1. The front part 2 holds two lenses 3 in the two rims it defines. The front part may be a hollow element due to recesses/cavities and closed/covered with a cover part. The area where the temple 4 is attached to the front part 2 is foldable and unfoldable and is the location of a joining part 5 that joints the temple 4 to the front part 2 allowing to fold and unfold the temple related to the front part so that the temple be movable between an open position and a closed position related to the front part.

Figure 2:
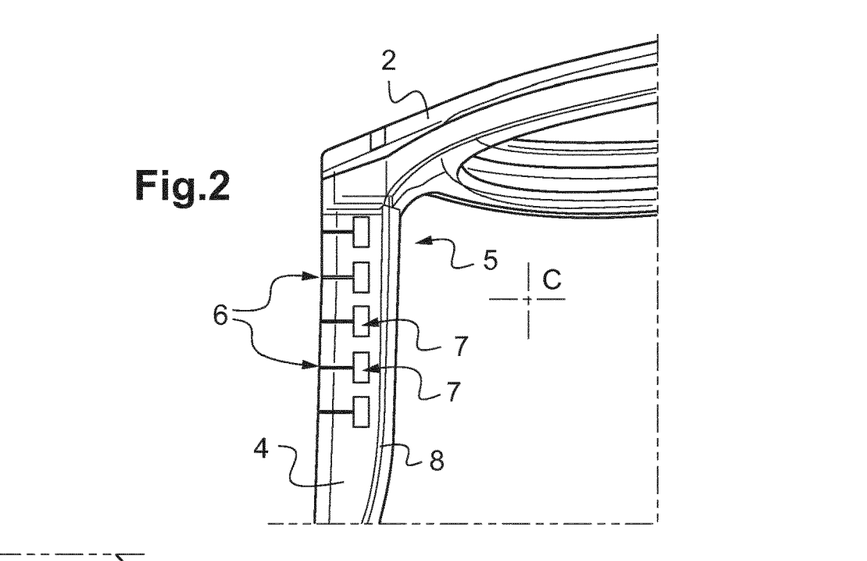
FIG. 2 is a partial view from above and with transparency of the spectacle frame of FIG. 1, in the unfolded/open state.

On FIG. 2, the joining part 5 is better seen, the spectacle frame being represented in transparency. This allow the wiring 8 to be seen as wires between the front part 2 and the temple 4 through the joining part 5. The wiring 8 is embedded or at least arranged within the joining part so that the wiring is not exposed to the environment. The joining part 5 has an internal face that is facing the wearer of the spectacle frame and an external face opposite to the internal face. The external face of the joining part is structured with slots 6 and internally with voids 7 to allow the remaining of the joining part to be bent with a radius of curvature which center is schematized by the point C. It is obvious that when the temple 4 is folded, the joining part bends and the slots 6 opens and widens. In other instances, the voids 7 may be reduced or suppressed depending of the flexibility of the material(s) that is(are) used to manufacture the spectacle frame 1. Such an arrangement creates a first type of stop that is a stop to the unfolding/opening of the temple thus avoiding the largest curvature radius value to overpass a predefined maximum curvature radius value.

Figure 3:
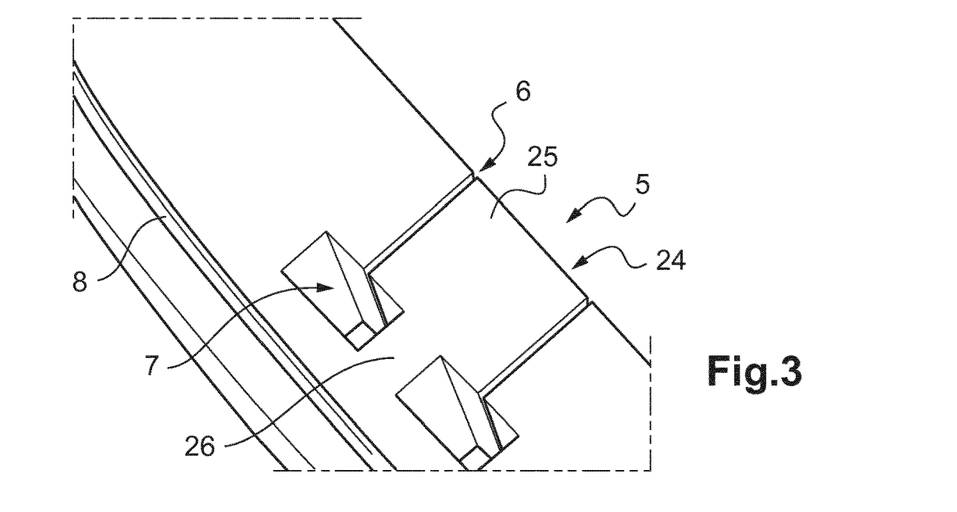
FIG. 3 is an enlarged section from above of the joining part of the spectacle frame of FIG. 1, in the unfolded/open state.

On FIG. 3, the voids 7 and slots 6 of the joining part 5 are better seen in the unfolded/open state/position of the spectacle frame. Between the slots are protruding elements 24 having enlarged heads 25 (that may be called toes). In other embodiments, the voids 7 may be used to locate electric or electronic parts or may be filled with an elastic, notably foam, material.

Note that other cavities can be create passing through the three-dimensional printed hinged joining part or at other places, notably to imbed sensors or other electronic parts. For example, strain gauge sensors are well known components that can convert traction or flexion strain into an electrical signal. Such a strain gauge can be arranged on the flexible cable to measure the state/position of the temples which indicates if the spectacle/glasses are worn or not.

It should be noted that the slots are on the external face of the joining part and that the slots are closed in the unfolded/open state of the spectacle frame in this first type of stop.

It is also possible to reverse this arrangement with slots on the internal side of the joining part and in such instance the slots should be wide in the unfolded/open state because when the temple is folded the slots reduces till they totally close thus effectively preventing overpass of the predefined minimum curvature radius value of the folding. Such a reverse arrangement creates a second type of stop that is a stop to the folding/closing of the temple thus avoiding the smallest curvature radius value to underpass a predefined minimum curvature radius value.

Figure 9:
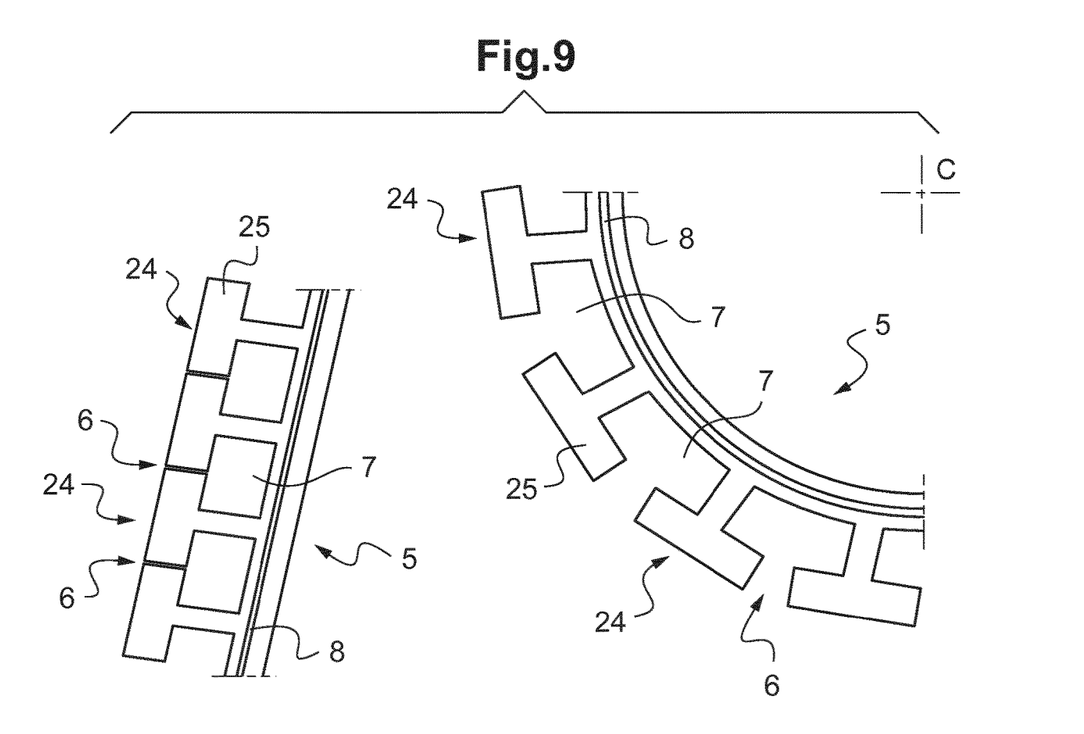

A similar shape of the material(s) of the joining part 5 is represented on FIG. 9 where the slots 6 are gaps between enlarged heads 25 of protruding elements 24. On the left of the FIG. 9 the state is unfolded/open and the slots 6 are of reduced to null width and on the right in the folded/closed state with wide widths of the slots. As for the previous example of FIGS. 2, 3, the arrangement of the protruding elements 24 on the external face of the joining part 5 may be arranged reversely on the internal face of the joining part thus effectively providing a bending limitation. The enlarged heads 25 of the protruding elements 24 may be omitted in some embodiments. More generally, other shapes of the material(s) of the joining part may be used.

Such design includes slots and voids on the external or internal side of the temple to allow to reduce the temple's section on the joining part forming a hinge area. This reduction of section also reduces the resistance to torsion. This way, the temple can be closed by elastic deformation concentrated in this area, with a pressure or a torque applied on the extremity of the temple. In this case, as soon as the pressure or torque are cancelled, the temple will return to its stable position. This stable position, open or closed, will depend on the initial printing position or, for some material, e.g. Acetate, PA12 . . . , on the way it may be changed when forming the temple with heat.

The material the joining part is made allows its elastic bending due to flexibility without noticeable degradation of its mechanical properties. This is obtained by the shape of the part of the joining part that bends, notably by its reduced thickness(es), and/or the use of a material, or materials, with appropriate mechanical properties, i.e. appropriate flexibility. Flexibility is opposed to the rigidity and the flexibility that is considered for the joining part is an elastic flexibility.

In the case slots are arranged in the joining part, it is preferable to cover the joining part with an elastic material in order the slots are not exposed to the environment and notably to the hairs of the wearer that could become clamped in the slots.

Figures 4, 5, 6, 7:
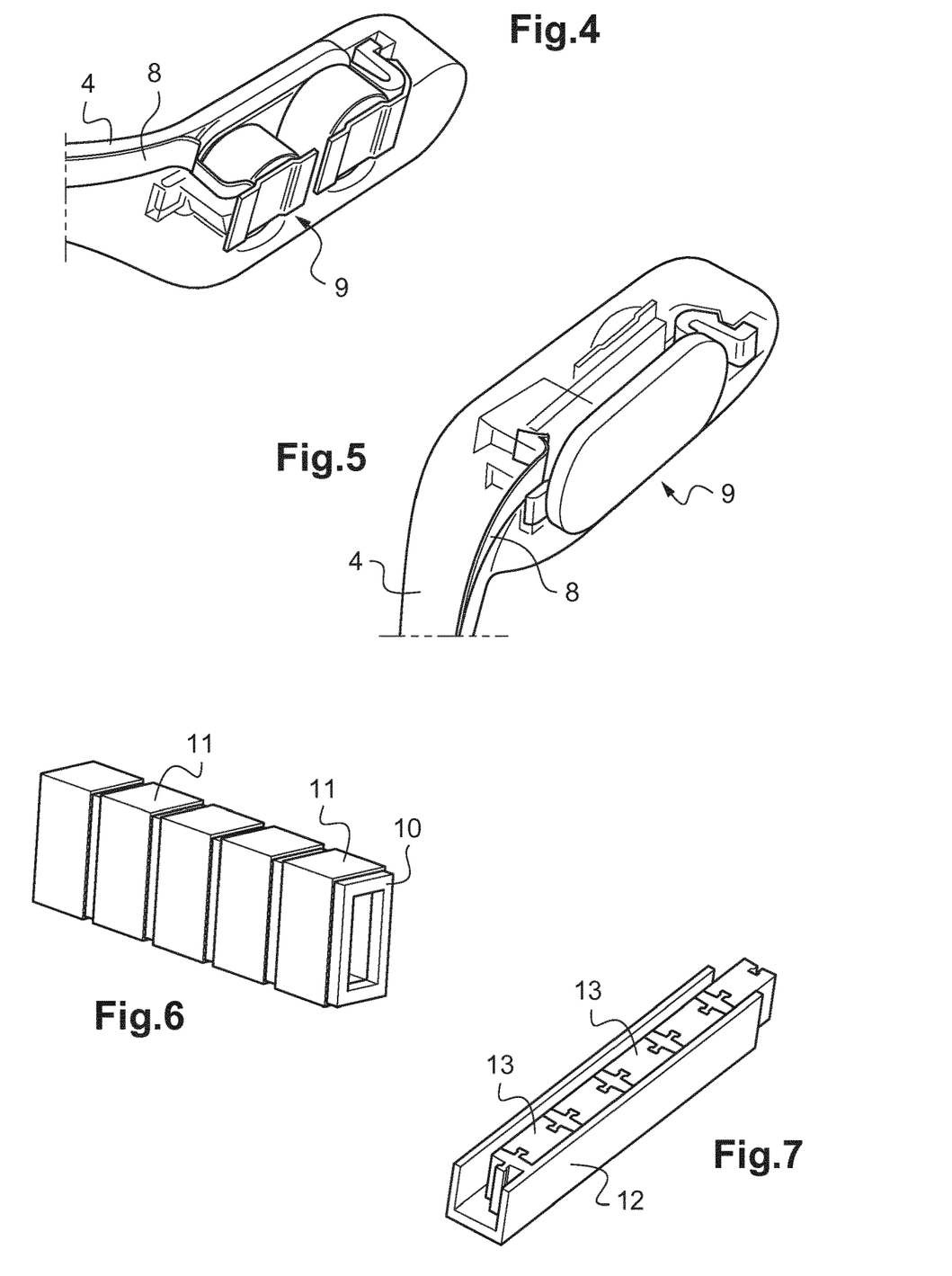
FIGS. 4 and 5 are perspective views with transparency of the ends of the temples containing button cells/batteries.
FIGS. 6, 7, 8 are views of other embodiments of the joining part of a spectacle frame according to the invention, each using materials with different flexibilities, FIG. 9 are enlarged section views from above of a joining part derived from the one of the spectacle frame of FIG. 1, in unfolded/open state (left view) and in folded/closed state (right view), FIG. 10 are views of another embodiment of the joining part of a spectacle frame according to the invention, using materials with different flexibilities, in unfolded/open state (left view) and in folded/closed state (right view), FIG. 11 are views of another embodiments of the joining part of a spectacle frame according to the invention with parts in the form of blades, in unfolded/open state (top view) and in folded/closed state (bottom view)

On FIGS. 4 and 5, batteries can be seen by transparency in the end of the temple that is due to be hidden behind the ear of the wearer. In this instance, the wiring 8 if used for supplying electric power to an electronical device located at least in part in the front part of the spectacle frame.

The possibility to use several materials allows the designer to work with the roughness and elasticity of those ones. A harder material, or at least a less flexible material, would provide strength and rigidity to the system in the axis(es) where rigidity is need. On the other side, a more flexible material would allow the system to deform easily and to follow the expected curve where it is needed. Incidentally, a flexible material would also bring the possibility to increase the non-permeability of the system.

Figure 10:
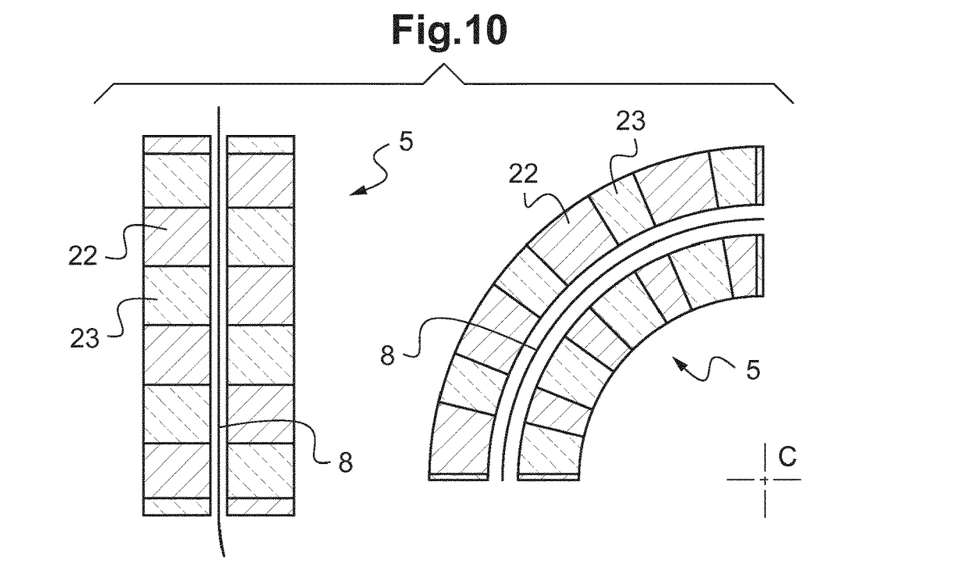

FIGS. 6, 7 and 10 represent other examples of joining parts that can be bend and they are made of two types of materials having different flexibility levels. One of the materials is intrinsically more flexible than the other. The flexible material has elastic/resilient properties that allows it to regain its initial shape when it is not subjected to an external strength or force.

In some embodiments of the joining part, the joining part keep the last shape it had when an external force has been suppressed and in other embodiments, the joining part regain a predetermined shape, or more generally another shape, when an external force having deformed it is suppressed. The joining part, as a whole, can thus have or not elastic properties. Therefore, the deformation of the joining part can be permanent or semi-permanent as regards the application or not of external forces.

For the current invention, when a material is said to be a hard material, this is to be understood as not being flexible and this is understood as the contrary of a flexible material.

On the two examples of FIGS. 6 and 7, the flexible parts 10, 12 would ensure the flexibility of the system while the rigid parts 11, 13 would limit the curvature and ensure to protect the wiring. In a comparative way, it would work as a spine with the bones as rigid parts 11, 13, the intervertebral articulations with disks as the flexible parts 10, 12 and the neural system being the wiring.

On the example of FIG. 10, the hard material 22 and the flexible material 23 parts are interleaved and as seen on the right side of the figure with the folded/closed state, the flexible material parts are compressed and the temples are subjected to a force to be kept in the folded/closed state. On the left side of the figure, the temple has been left free and it has regained its initial shape of the unfolded/open state being not subjected to any force. In a reverse embodiment, the unfolded/open state is the one in which the temple should be subjected to a force to be kept open, the spectacle frame folding/closing automatically when free, i.e. not subjected to a force.

The three-dimensional printing processes also allow to create parts inside parts. It is then possible to create a succession of articulation directly inserted in the structure, all printed at once and already assembled.

Figure 8:
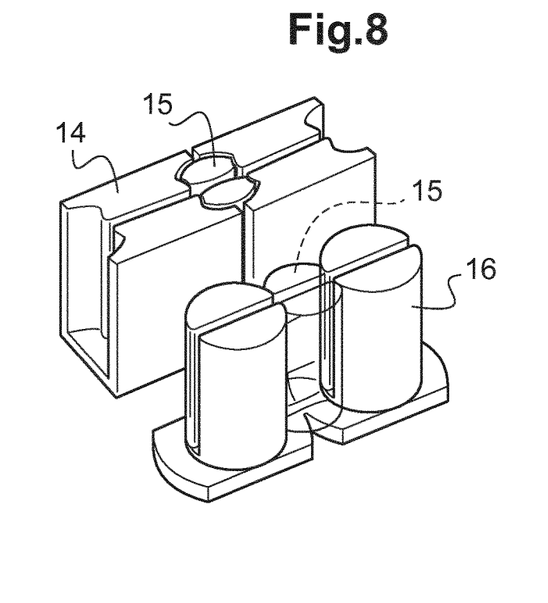

On the two examples of FIG. 8, parts can rotate around each other, 14 and 15 for the first example or 15 and 16 for the second example, up to a limited angle. With the repetition of this pattern as a chain, a hinged joining part with a predefined minimum radius of curvature can be manufactured. This will avoid damaging a wiring installed inside the median cavity.

The value of the predefined minimum curvature radius for protection the wiring against excessive bending in the folded/closed state of the temple is chosen according to the mechanical characteristics of said wiring, notably in terms of resistance against breakage when the temple is folded or, possibly, stretched when the temple is unfolded.

To go further in the complexity of the hinged joining part it is possible to three-dimensional print special shapes that would bring a bi-stable or more positions for the temples: open and closed and, possibly, some intermediate position(s). One possibility would be to use a system of blades as shown on FIG. 11. Those blades could also be replaced with a cam or another mechanical principle.

Figure 11:
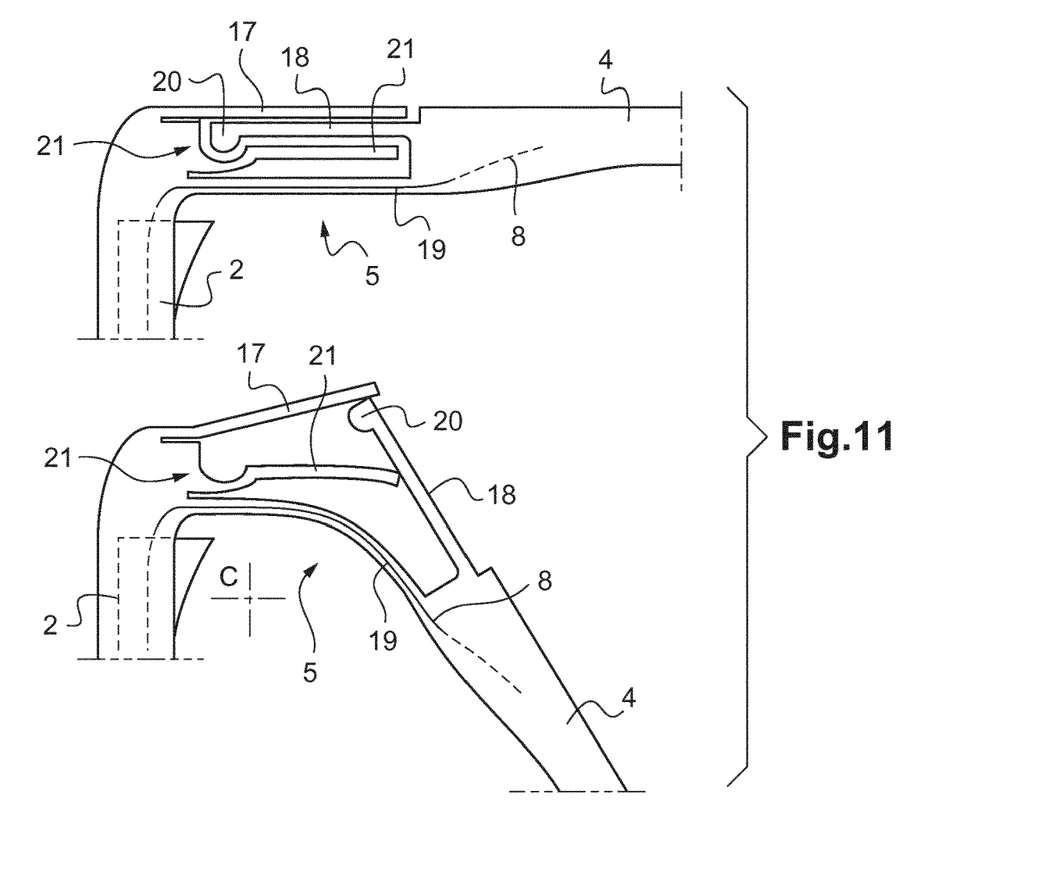

More precisely, on FIG. 11, the joining part 5 comprises a stop device with a bridge part 19, an abutment part 17, a sliding part 18 and a locking part 21. The end of the sliding part 18 comprises an enlarged head 20 that can be locked into a recess 21 of the base of the locking part 21 in the unfolded state of the spectacle frame. The bridge part 19 is more flexible than the abutment 17, sliding 18 and locking 21 parts and this could be obtained with a bridge part 19 that has a lower thickness than the other parts 17, 18, 21 but also using different materials for the bridge part 19 than for the other parts 17, 18, 21. In such an arrangement the first and second types of stops are created because it can avoid the largest curvature radius value to overpass a predefined maximum curvature radius value when unfolding/opening the temple and also it can avoid the smallest curvature radius value to underpass a predefined minimum curvature radius value when folding/closing the temple.

Figure 12:
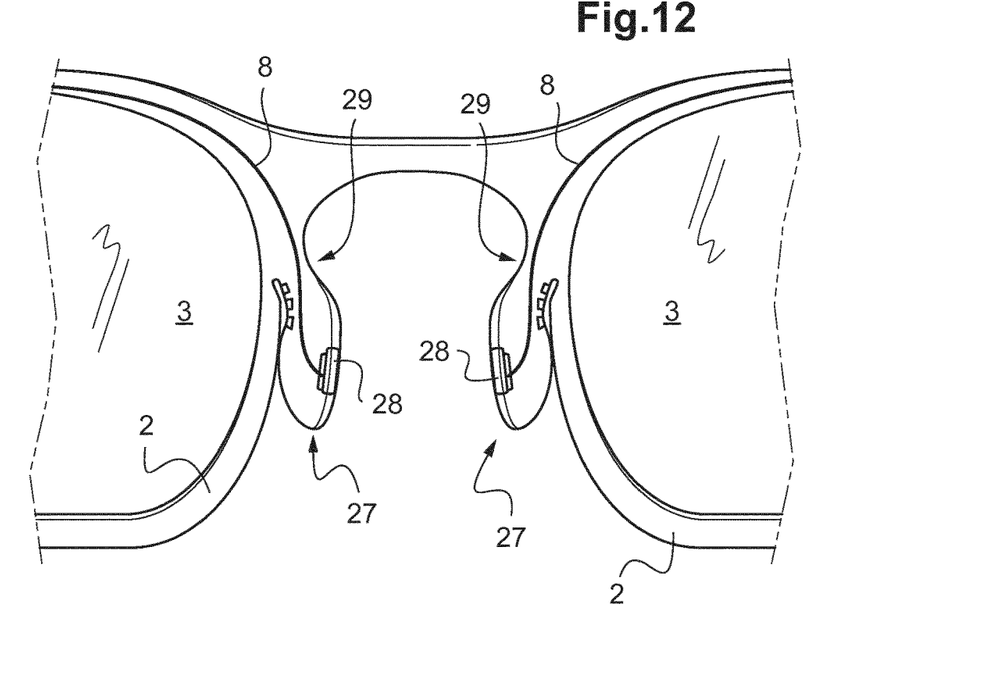
FIG. 12 is another application of the joining part, between the front part of the frame and nose pads receiving the wiring.

Other applications of the joining part in a spectacle frame are possible. For example, on FIG. 12 which is a partially transparent view, the joining part 29 is arranged between a nose pad 27 and the front part 2 of the spectacle frame. The nose pad receives an electrical wiring 8 that is located within the front part 2 and the deformability of the joining part 29 allows the nose pads to be displaced to fit the nose and face of the wearer without risking the destruction of the wiring 8. Electronic components or other electric or electronic items may be located within the nose pads 27 and, in the current example, these are sensors 28 connected to the wiring 8. Those sensors are, still in the current example, simple electric conductor pads/electrodes contacting the skin of the wearer.

Figures 13, 14:
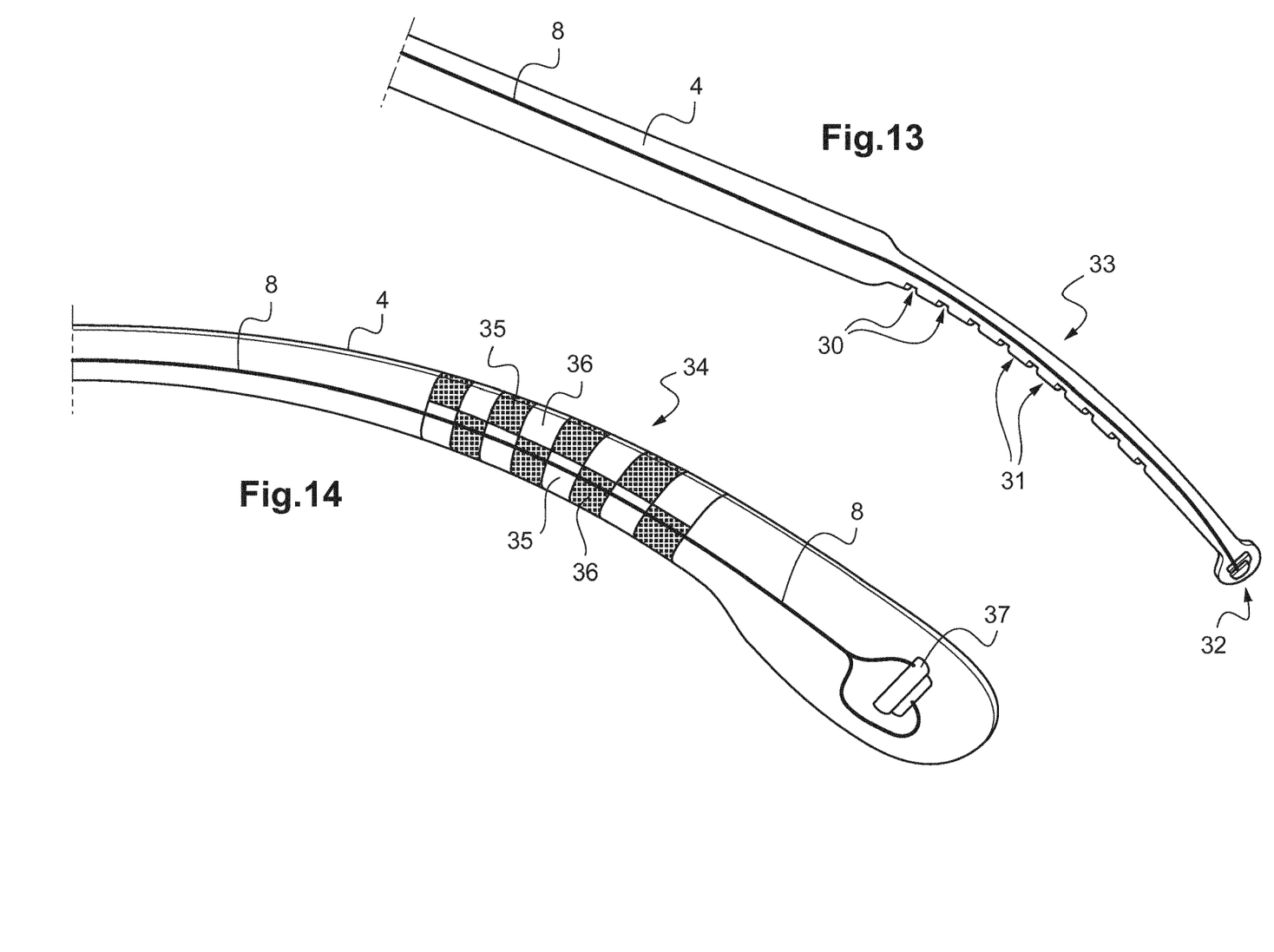
FIG. 13 is another example of temple comprising a joining part according to the invention.
FIG. 14 is a further example of temple comprising a joining part according to the invention.

On FIG. 13, which is a partially transparent view, the temple 4 comprises toward its end, a joining part 33. The joining part 33 is located in relation to the root of the ear of the wearer on which it bears. Thanks to the joining part that can be deformed according to the form and location of the root of the ear, there can be a perfect holding and fitting of the spectacle to the wearer. An electrical wiring 8 is arranged within the temple 4 and that is connected to an electric or electronic item arranged at the end of the temple, in this instance a sensor 32 that can be perfectly positioned thanks to the joining part 33. The temple can be the combination of a metallic core covered with a covering material or any other combination or, even, made of a unique material.

The joining part 33 that is bendable is formed of protruding elements 31 separated by gaps 30 and that are arranged on the side of the temple facing the center of curvature.

It can be noted that, in particular for joining parts having an extended length, the shape of the deformation can be rendered more complex than a simple circle or concave shape, more generally curvature, toward a unique center of curvature (the deformation being in a plane) and in such more complex shapes, the deformation can be done in the three-dimensions. Such three-dimensions deformation can, in the case of the current example, be obtained with protruding elements 31 and gaps 30 arranged of different faces of the temple and not only on its lower face. For example, the anterior protruding elements 31 and gaps 30 may be arranged on the lower face of the temple while the posterior (nearest to the sensor 32) protruding elements 31 and gaps 30 may be arranged on more faces, or even on all faces, of the temple.

On FIG. 14, which is a partially transparent view, the temple 4 comprises toward its end, a joining part 34. The joining part 34 is located in relation to the root of the ear of the wearer on which it bears. In the current instance, a battery 37 is located at the end of the temple 4 and connected to an electrical wiring 8. The joining part 34 is a juxtaposition, as a checkerboard, of rigid and flexible materials 35, 36. Preferably, the flexibility of the flexible material is increased with the temperature of the material and at room temperature the flexibility is much decreased and most preferably very low and in such a case the rigid material may be replaced with an elastic material. Still in another embodiment, the joining part may use an electro-sensitive material.

Figure 15:
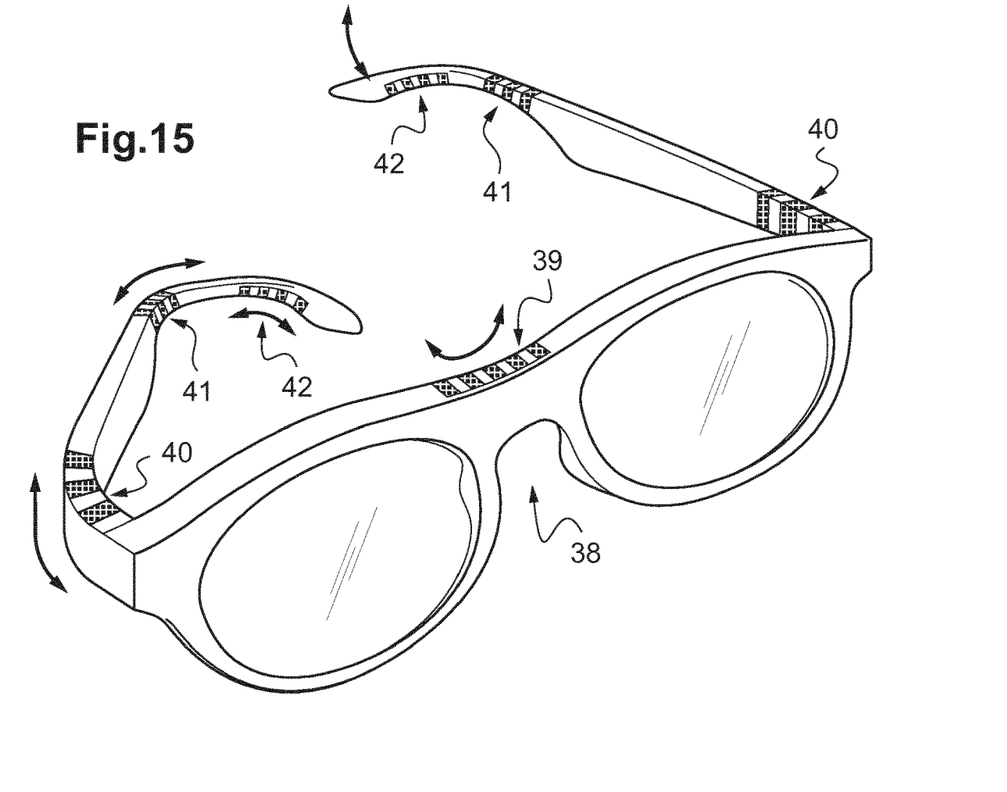
FIG. 15 is another example of a frame according to the invention.

On FIG. 15, the frame 38 has multiple joining parts that are juxtapositions of rigid and flexible materials: in the nose root zone 39 of the frame, in the front-temple connexion zone 40 and two 41, 42, on each temple, in the root of the ear zone of the temple. These allow to perfectly adjust the frame to the wearer. This adjustment can be permanent or not depending of the juxtaposed materials. For example, if a material is flexible or elastic at room temperature, the adjustment can be modified at will, and if it is only flexible when heated, the adjustment will be permanent under room temperature conditions.

It should be noted that each set, in other words the first part, the joining part and the second part, of the frame might be present alone or not, and that means that they can be integral to each other or integral partly, i.e. the joining part with the first part or the joining part with the second part or any other possible combination allowing them to be integral or even independent in the meaning of not being integral one with the other(s).

In addition to use three-dimensional printing to manufacture the parts/elements of the spectacle frame 1, electronics and wiring can also be manufactured with three-dimensional printing technologies. For example, Aerosol Jet Technology (AJT) can be used to print the spectacle frame and also the electric conductors on the same process.

As an example, such product design includes the following element, but this could be applied to any advanced eyewear technology and manufacture:
- one main spectacle frame with a front part, a joining part and temples printed in one part,
- one front cover that covers the front part of the spectacle frame,
- at least two cover components used to close the frame where it is open,
- at least one electronic card which manages the electronic function options,
- possibly, two sensors on each side of the frame,
- one or two buttons batteries,
- at least one flexible cable running along the frame from the left to the right temple to connect the batteries to the electronic card, the sensors could be directly mounted on this flexible cable.

The spectacle frame in this example is printed in one part but it is possible to manufacture it as several parts that are assembled. For examples, the extremities of the temples, the nose pads . . . may be manufactured, preferably three-dimensional printed, separately.

With such product design, the main frame has been designed to imbed the flexible cable which is to be inserted inside openings of the spectacle frame kept clear by the three-dimensional printing process. Once the flexible cable has been inserted, it is possible to connect it to the electronic card and to the batteries directly or through additional connecting devices. Once the connection(s) done, the covers can close the temples to hide the wiring and electronics and to protect the wearer. It is also possible to seal or pot the wiring and electronic card before inserting the covers thus ensuring a water proof containment.

In this example, a cavity for the wiring is made along at least the temples and that is finally covered but it is also possible to directly built with three-dimensional printing a tunnel along the temple 4 and possibly along the joining part 5 and the front part 2 and that is opened at its extremities. The wiring can be introduced in the tunnel through one of its extremity openings. The shape can be a curved tunnel in the hinge. This tunnel could run from the extremity of one temple to the extremity of the other temple, passing through the hinged joining part and the face part of the spectacle frame. It makes the realization of a waterproof electronic frame very easy.

Another advantage of using three-dimensional printing is that it is easily possible to arrange the wiring along the neutral fiber of a deformable frame and that can be determined by finite element analysis for example, so as to minimize the traction and the friction on the wiring.

As every wearer is different and wear the glasses at different locations, notably relative to the eyes, the three-dimensional printing process and CAD drawing parameters offer the possibility, with the good data, to adapt the frame to each wearer anatomy. An example can be an adaptation of the width of the enlarged heads (toes), and so in the unfold/open state of the angular position of the temple 4 relative to the front part 2, depending on the width of the wearer head.

Furthermore, each sensor on the front face needs to have a special orientation to be in the view axis of the wearer. This three-dimensional printing process of variable parameters also allows to adapt the location of the sensors to the wearer's needs. Another application of this adjustable location of the sensor would be with any sensor that needs to be in contact with the skin.

The invention claimed is:

1. A spectacle frame comprising:
   a first part that is a front part;
   a second part that is a temple;
   a joining part joining the second part to the first part allowing to fold and unfold the second part relative to the first part so that the second part be movable between respective closed position and open position; and
   at least an electrical wiring arranged through the joining part to allow an electrical connectivity between the first part and the second part,
   wherein the joining part is elastically deformable with curvature radius values higher than a predefined minimum curvature radius value,
   wherein the joining part is made of a single material, and
   wherein the joining part comprises a bridge part, an abutment part and a sliding part forming first and the second stop devices,
   the bridge part being integral to the first part and to the second part to create a bridge between the first part that is the front part and the second part that is the temple, said bridge part being flexible,
   the abutment part being integral to the first part and being less flexible than the bridge part,
   the sliding part being integral to the second part and being less flexible than the bridge part, and
   the sliding pan being located between the bridge part and the abutment part, the bridge part being located facing the center of curvature of the folding, in order that when the second part is folded, the sliding part bears and slides on the abutment part and creates a strength opposed to the folding.

2. The spectacle frame according to claim 1, wherein the joining part comprises multiple elements having different flexibility levels due to their different shapes.

3. The spectacle frame according to claim 2, wherein the multiple elements comprise a plurality of protruding elements and/or a plurality of voids designed to reduce section of the joining part.

4. The spectacle frame according to claim 3, wherein the joining part has an internal face on a side of the joining part facing the center of curvature of the folding and an external face opposite to the internal face, the protruding elements and/or the voids being arranged on the internal face and/or on the external face of the joining part.

5. The spectacle frame according to claim 4, wherein the joining part comprises a first stop device intended to prevent the curvature radius values of the joining part to be greater than a predefined maximum curvature radius value when unfolding the second part relative to the first part.

6. The spectacle frame according to claim 5, wherein the protruding elements form the first stop device, the protruding elements being arranged on the external face of the joining part, each protruding element having a stem and an enlarged head forming the end of the stem, the heads being separated by gaps when the second part is folded, said gaps reducing when the second part is unfolded till the heads abut together thus creating a stop to the unfolding and preventing overpass of the predefined maximum curvature radius value.

7. The spectacle frame according to claim 6, wherein the joining part comprises a second stop device intended to prevent the second part from going beyond a defined closed position in which the curvature radius value of the joining part is higher than the predefined minimum curvature radius value.

8. The spectacle frame according to claim 7, wherein the protruding elements form the second stop device, the protruding elements being arranged on the internal face of the joining part, each protruding element having a stem and an enlarged head forming the end of the stem, the heads being separated by gaps when the second part is unfolded, said gaps reducing when the second part is folded till the heads abut together thus creating a stop to the folding and preventing the second part from going beyond the defined closed position.

9. The spectacle frame according to claim 5, wherein the joining part comprises a second stop device intended to prevent the second part from going beyond a defined closed position in which the curvature radius value of the joining part is higher than the predefined minimum curvature radius value.

10. The spectacle frame according to claim 9, wherein the protruding elements form the second stop device, the protruding elements being arranged on the internal face of the joining part, each protruding element having a stem and an enlarged head forming the end of the stem, the heads being separated by gaps when the second part is unfolded, said gaps reducing when the second part is folded till the heads abut together thus creating a stop to the folding and preventing the second part from going beyond the defined closed position.

11. The spectacle frame according to claim 1, wherein the joining part is made of a hard material and of a flexible material.

12. The spectacle frame according to claim 11, wherein the hard material is inserted in a matrix of the flexible material or the flexible material is inserted in a matrix of the hard material so that the flexible material ensures the flexibility of the joining part while the hard material ensure the curvature radius value of the joining part to be higher than the predefined minimum curvature value.

13. The spectacle frame according to claim 1, wherein the first part is a first part of the frame and the second part is a second part of the frame.

14. A method for manufacturing a spectacle frame including a first part that is a front part, a second part that is a temple, a joining part joining the second part to the first part allowing to fold and unfold the second part relative to the first part so that the second part be movable between respective closed position and open position, and at least an electrical wiring arranged through the joining part to allow an electrical connectivity between the first part and the second part, wherein the joining part is elastically deformable with curvature radius values higher than a predefined minimum curvature radius value, comprising:
   generating the spectacle frame using a three-dimensional printing process for at least one part of the spectacle frame,
   wherein the joining part is made of single material, and
   wherein the joining part comprises a bridge part, an abutment part and a sliding part forming first and the second stop devices, the bridge part being integral to the first part and to the second part to create a bridge between the first part that is the front part and the second part that is the temple, said bridge part being flexible, the abutment part being integral to the first part and being less flexible than the bridge part, the sliding part being integral to the second part and being less flexible than the bridge part, and the sliding part being located between the bridge part and the abutment part, the bridge part being located facing the center of curvature of the folding, in order that when the second part is folded, the sliding part bears and slides on the abutment part and creates a strength opposed to the folding.

15. The method for manufacturing a spectacle frame according to claim 14, wherein the method further comprises creating a housing in the joining part on the basis of data of a given wearer, the housing being designed to receive a wiring and eventually at least one sensor.

16. The method for manufacturing a spectacle frame according to claim 14, wherein the joining part is made of a single material, wherein the joining part comprises multiple elements having different flexibility levels due to their different shapes, wherein the multiple elements comprise a plurality of protruding elements and/or a plurality of voids designed to reduce section of the joining part, wherein the joining part has an internal face on side of the joining part facing the center of curvature of the folding and an external face opposite to the internal face, the protruding elements and/or the voids being arranged on the internal face and/or on the external face of the joining part, wherein the joining part comprises a first stop device intended to prevent the curvature radius values of the joining part to be greater than a predefined maximum curvature radius value when unfolding the second part relative to the first part, wherein the joining part comprises a second stop device intended to prevent the second part from going beyond a defined closed position in which the curvature radius value of the joining part is higher than the predefined minimum curvature radius value, and wherein the protruding elements form the second stop device, the protruding elements being arranged on the internal face of the joining part, each protruding element having a stem and an enlarged head forming the end of the stem, the heads being separated by gaps when the second part is unfolded, said gaps reducing when the second part is folded till the heads abut together thus creating a stop to the folding and preventing the second part from going beyond the defined closed position.

\* \* \* \* \*